United States Patent
Stampoulidis et al.

(10) Patent No.: US 9,762,020 B1
(45) Date of Patent: Sep. 12, 2017

(54) BI-DIRECTIONALLY PUMPED POLARIZATION MAINTAINING FIBER AMPLIFIER

(71) Applicant: Gooch and Housego PLC, Ilminster, Somerset (GB)

(72) Inventors: Leontios Stampoulidis, Torquay (GB); Efstratios Kehayas, Newton Abbot (GB)

(73) Assignee: Gooch and Housego PLC, Somerset (GB)

( * ) Notice: Subject to any disclaimer, the term of this patent is extended or adjusted under 35 U.S.C. 154(b) by 0 days.

(21) Appl. No.: 15/406,255

(22) Filed: Jan. 13, 2017

(51) Int. Cl.
*H01S 3/067* (2006.01)
*H01S 3/094* (2006.01)
*H01S 3/00* (2006.01)
*H04B 10/29* (2013.01)

(52) U.S. Cl.
CPC ...... *H01S 3/094011* (2013.01); *H01S 3/0064* (2013.01); *H01S 3/06733* (2013.01); *H01S 3/06766* (2013.01)

(58) Field of Classification Search
CPC .................. H01S 3/06712; H01S 3/094011
See application file for complete search history.

(56) References Cited

U.S. PATENT DOCUMENTS

| | | | | |
|---|---|---|---|---|
| 5,890,816 | A | * 4/1999 | Delavaux | H04B 10/2572 359/341.2 |
| 6,038,061 | A | 3/2000 | Sugaya | |
| 6,327,077 | B1 | 12/2001 | Okazaki | |
| 6,597,494 | B2 | 7/2003 | Segi et al. | |
| 6,990,270 | B2 | 1/2006 | Nicholson | |
| 2003/0021012 | A1* | 1/2003 | Segi | H01S 3/06754 359/341.1 |
| 2007/0253055 | A1* | 11/2007 | Chowdhury | H01S 3/10007 359/333 |

FOREIGN PATENT DOCUMENTS

| | | |
|---|---|---|
| EP | 0863629 A2 | 9/1998 |
| EP | 1170837 A1 | 1/2002 |

* cited by examiner

*Primary Examiner* — Eric Bolda
(74) *Attorney, Agent, or Firm* — Jetter & Associates, P.A.

(57) ABSTRACT

A bi-directionally pumped PM fiber amplifier includes an amplifier input coupled to a first WDM coupler and a second WDM coupler providing an amplifier output. A doped fiber is between the WDM couplers. A first pump light source emitting at a first wavelength along a first polarization axis is coupled to the WDM coupler through a polarization beam combiner/splitter and a polarization rotator is for downstream pumping of the doped fiber with rotated light relative to the first polarization. The fiber is upstream pumped with light having the first polarization using a second pump light source emitting at the first wavelength/first polarization, by an output of an optical power splitter with its input coupled to the first pump light source, or by a fiber-coupled rotator mirror coupled to the second WDM coupler.

20 Claims, 7 Drawing Sheets

BI-DIRECTIONALLY PUMPED POLARIZATION MAINTAINING FIBER AMPLIFIER

FIELD

Disclosed embodiments relate to polarization maintaining (PM) fiber amplifiers.

BACKGROUND

In fiber-optics, a polarization-maintaining optical fiber (PMF or PM fiber) is a single-mode optical fiber in which linearly polarized light if properly launched into the fiber maintains a linear polarization during its propagation. The polarized light thus exits the fiber in a specific linear polarization state so there is essentially no cross-coupling of optical power between the two orthogonal polarization modes. Such fiber is used in special applications where preserving polarization is essential. PM fiber amplifiers use PM fibers and are needed in some high reliability applications in which the fiber amplifier is required to operate with as well as maintain a specific state of polarization of the received optical launch signal.

State-of-the-art PM amplifiers involve an all-PM fiber structure incorporating fiber components built with PM fibers as well as a PM doped fiber. The PM fiber includes but is not limited to PANDA fibers that have a step index profile and elliptical core fibers. Variants of these PM fibers include PM fibers that allow transmission in a specific polarization axis or non-polarizing which allow transmission on both polarization axes.

There are several known methods for pumping PM fiber amplifiers that use first and second pump lasers emitting at the same wavelength (e.g., electrically pumped laser diodes providing an emission at 980 nm for an Erbium Doped Fiber Amplifier (EDFA) which emits amplified light within the 1525-1565 nm band. Co-propagating (or forward) pumping is known for a low Noise Figure (NF), but results in low power conversion efficiency (PCE) and a low gain. Forward pumping means that the pump wave travels in the same direction as the signal wave. Counter-propagating (or backward) pumping is known for a high NF with high PCE and high gain. Backward pumping means that the pump wave travels in the opposite direction as the signal wave. Bi-directional pumping involves pumping in both the forward and backward directions simultaneously to realize the advantages of both the co-propagating and counter-propagating schemes.

Bi-directional pumping is thus often desirable since it can maintain a low NF and at the same time achieve a high PCE. However, optical cross-talk between co-propagating and counter propagating pump lasers can occur. Optical isolators such as Faraday rotators which allow light to pass only in a single direction are known to provide protection of active devices such as lasers against injection of unwanted light. However, optical isolators are generally expensive, lossy and bulky components, in particular when used for isolating light in the short wavelengths. Therefore the deployment of optical isolators is generally not practical from the system point of view in terms of cost, efficiency and size.

One other solution to mitigate the problem of pump laser crosstalk in bi-directionally pumped PM fiber amplifiers involves using pump lasers emitting at different wavelengths. These pump lasers typically employ fiber Bragg grating filters for stabilization to filter-out/reject incident signals of a wavelength outside the Bragg grating filter's pass-band.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize in applications including hi-reliability PM fiber amplifiers the use of bi-directionally pumping is often not possible due to the optical crosstalk between co-propagating and counter propagating pump light sources (e.g. laser diodes). In practice any residual pump light originating from the co-propagating pump light source that is not absorbed by the doped fiber will be incident onto the counter-propagating pump light source, and vice versa. The injection of light into the pump light source can affect its stability, reliability and lifetime. As a consequence the gain of the PM fiber amplifier can become unstable and the reliability of the PM fiber amplifier can be compromised. In order to improve the amplifier's performance and reliability, a solution to minimize the crosstalk between co-propagating and counter-propagating pump light sources is recognized to be needed.

Disclosed example embodiments include single wavelength bi-directionally pumped PM fiber amplifiers that provide mitigated pump light source crosstalk. A disclosed bi-directionally pumped PM fiber amplifier includes an amplifier input coupled to a first Wavelength Division Multiplexing (WDM) coupler and a second WDM coupler providing an amplifier output. A doped fiber is between the WDM couplers. A first pump light source emitting at a first wavelength along a first polarization axis is coupled to the WDM coupler through a first polarization beam combiner/splitter (PBCS), and a polarization rotator is for downstream pumping of the doped fiber with rotated light relative to the first polarization. The doped fiber is upstream pumped with light having the first polarization using (i) a second pump light source emitting at the first wavelength/first polarization coupled by a second PBCS to the second WDM coupler, (ii) an optical power splitter having an input coupled to the first pump light source having its output coupled by the second PBCS to the second WDM coupler, or (iii) a fiber-coupled rotator mirror for recirculating residual light coupled to the second WDM coupler.

BRIEF DESCRIPTION OF THE DRAWINGS

Reference will now be made to the accompanying drawings, which are not necessarily drawn to scale, wherein.

DETAILED DESCRIPTION

Figure 1A:
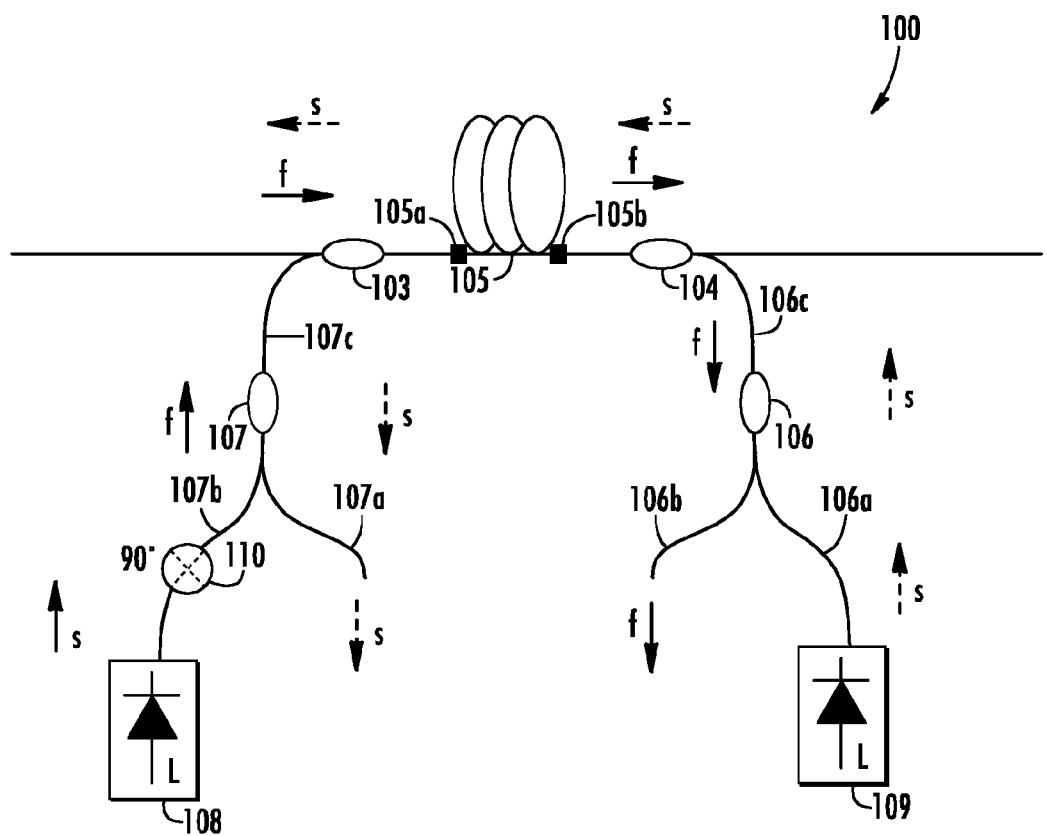
FIG. 1A shows a depiction of an example PM doped fiber amplifier having two pump light sources, one pump light source for providing co-propagating light and another pump light source for providing counter propagating pump light, according to an example embodiment.

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure.

COMPONENT IDENTIFICATION AS USED HEREIN 101, 102: fiber-optic isolators
103, 104: WDM coupler (signal/pump combiner)
105: doped fiber
105a: first end of the doped fiber 105
105b: second end of the doped fiber 105
106 Polarization beam combiner/splitter (PBCS)
107: PBCS
106a: The slow axis port of the PBCS 106
106b: The fast axis port of the PBCS 106
106c: The combined fast/slow axis port of PBCS 106
107a: The slow axis port of the PBCS 107
107b: The fast axis port of the PBCS 107
107c: The combined fast/slow axis port of the PBCS 107
108: Pump light source
109: Pump light source emitting at the same wavelength as the pump light source 108
110: A polarization rotator
112: A PBCS for re-use of received residual pump signals
113: An optical power splitter
114: A fiber-coupled rotator mirror FIG. 1A shows a depiction of an example PM doped fiber amplifier 100 having two pump light sources, pump light source 108 for providing co-propagating light and a pump light source 109 for providing counter propagating pump light, according to an example embodiment. Solid line arrows shown indicate the propagation direction of light from pump light source 108 which is on the downstream side of the propagation direction. The dashed line arrow shown shows the propagation direction of light from pump light source 109 which is on the upstream side of the propagation direction. When both pumps are present in a disclosed fiber amplifier system, pump light source 108 may be considered a first pump light source and pump light source 109 considered a second pump light source.

Although the pump light sources 108 and 109 are shown herein as laser diodes including symbolically as laser diodes in FIG. 1A, they can be other light sources or laser diode variants. For example, one laser diode variant is fiber pigtailed laser diodes spliced to fiber components or free-space coupled laser diodes. The free-space coupled laser diodes would be applicable especially in the case of a micro-optic assembly implementation (e.g., a laser diode chip coupled to a bulk PBCS or bulk rotator element through free-space using an optical micro-optic assembly bench).

The letters (f) and (s) shown in FIGS. 1A and 1n other FIGs. indicates the polarization state and polarization evolution of the light with (f) fast axis and (s) slow axis. All constituent components of the doped fiber amplifier 100 are constructed with PM fibers for maintaining the polarization state of both the signal light received and the pump light.

The PM doped fiber amplifier 100 includes a doped fiber 105 having a first end 105a and a second end 105b. Signal light is launched from a signal source (not shown) in the propagation direction shown left to right in FIG. 1A in the doped fiber 105 from its first end 105a to its second end 105b. Thus, the first end 105a of doped fiber 105 corresponds to a downstream side of the propagation direction and second end 105b corresponds to an upstream side of the propagation direction. Doped fiber 105 is generally doped with a rare earth (RE) element such that the doped fiber emission spectrum coincides with the signal light from the signal source to be amplified. As an example, erbium is generally the RE element of choice for signal amplification within the C-band (at about 1.55 µm). In that case the doped fiber amplifier 100 would be referred to as an EDFA.

Disclosed embodiments also include cladding-pumped fiber amplifiers. In this embodiment the doped fiber 105 can comprise a double-clad fiber including a doped core and an inner cladding, where the system further comprises optics for launching the optical signal into the doped core and optics for launching light from the pump light source 108 into the inner cladding. The signal light is thus launched into the doped core, while the pump light is launched into the inner cladding. As known in the art, the core can be D-shaped for more efficient pump light absorption.

Pump light source 108 is connected to a PBCS 107. PBCS 107 couples light launched through its input port 107a to its output port 107c given that the light polarization is in the perpendicular axis, known as and refer to hereafter as the slow axis polarization. Light with slow axis polarization launched through PBCS 107 port 107c will be coupled to PBCS 107 port 107a. Similarly PBCS 107 will couple light launched through its port 107b to its output port 107c given that the light polarization is in the vertical axis, known as and refer to hereafter as the fast axis polarization which is rotated 90 degrees from the slow axis. Light with fast axis polarization launched through PBCS 107 port 107c will be coupled to PBCS 107 port 107b. The same operation principle applies to PBCS 106 which is associated with pump light source 109.

According to the above operating principle, pump light source 108 is emitting light along the slow axis which is coupled through the polarization rotator 110 to port 107b of PBCS 107. The polarization rotator 110 rotates the light polarization by 90 degrees from pump light source 108. Polarization rotator 110 can be in its simplest form implemented as a 90 degree splice joint between the PM fibers of pump light source 108 and the PBCS 107. A 90 degree splice is generally straightforward to realize, and is not technically an optical component as it is realized during the splicing of two fibers. Basically one instructs the splicer apparatus to rotate one of the fibers by 90 degrees and then to splice the fibers. Polarization rotator 110 allows one to have both pump light sources 108, 109 emitting at the vertical polarization (the slow axis) and then flip (the polarization) of light from one of the pump sources to the horizontal polarization (the fast axis), most simply using a 90 degree splice.

Polarization rotator 110 can also comprise a Faraday rotator. Going through polarization rotator 110 the polarization of light emitted by the pump light source 108 will be converted from the slow axis to fast axis. As such pump light from pump light source 108 will be coupled from port 107b to port 107c of PBCS 107. Similarly pump light source 109 is emitting light in the slow axis and is coupled to PBCS 106 port 106a. As such pump light source 109 will be coupled from PBCS 106 port 106a to port 106c. For the doped fiber amplifier 100 being an EDFA both pump light sources 108 and 109 will be generally emitting light around the 980 nm band since pump light in this band is suitable to excite erbium ions of the doped fiber 105 to provide optical gain in the C-band. Pumping at 1480 nm is also possible, but results on a lower absorption cross-section. Pumping at other wavelengths is also possible.

A WDM optical coupler 103 connects port 107c of the PBCS 107 to first end 105a of doped fiber 105, and WDM optical coupler 104 connects port 106c of PBCS 106 to second end 105b of doped fiber 105. Accordingly, light emitted by pump light sources 108 and 109 propagate in the downstream and upstream directions, respectively.

In the downstream direction a majority of the light from pump light source 108 generally will generally be absorbed by doped fiber 105 and any un-absorbed light, referred to hereafter as downstream residual pump light, which will exit the doped fiber 105 through its second end 105b. Downstream residual pump light from pump light source 108 will then be coupled to port 106c of PBCS 106 through WDM coupler 104. The downstream residual pump light having a fast axis polarization will exit PBCS 106 through its port 106b avoiding interference with the pump light source 109.

In the upstream direction light from pump light source 109 will be absorbed by doped fiber 105 and any un-absorbed light, referred to hereafter as upstream residual pump light, will exit the doped fiber 105 through its first end 105a. Upstream residual pump light from pump light source 109 will then be coupled to port 107c of PBCS 107 through WDM coupler 103. The upstream residual pump light having slow axis polarization will exit PBCS 107 through its port 107a avoiding interference with the pump light source 108.

With respect to signal light propagation through the doped fiber amplifier 100, signal light launched is coupled to WDM coupler 103 which couples the signal light into first end 105a of the doped fiber 105 and as such signal light propagates in the downstream direction, the same direction as the light signal from the pump light source 108 and opposite in direction relative to the light signal from pump light source 109. Signal light will be amplified within the doped fiber 105 and will exit the doped fiber 105 through its second end 105b. The amplified signal is coupled through the WDM coupler 104. In arrangements where back-reflections can pose amplifier problems, fiber-optic isolators 101 and 102 can be added at the input and the output of the amplifier as shown in FIG. 1B (and other FIGs.) described below.

Figure 1B:
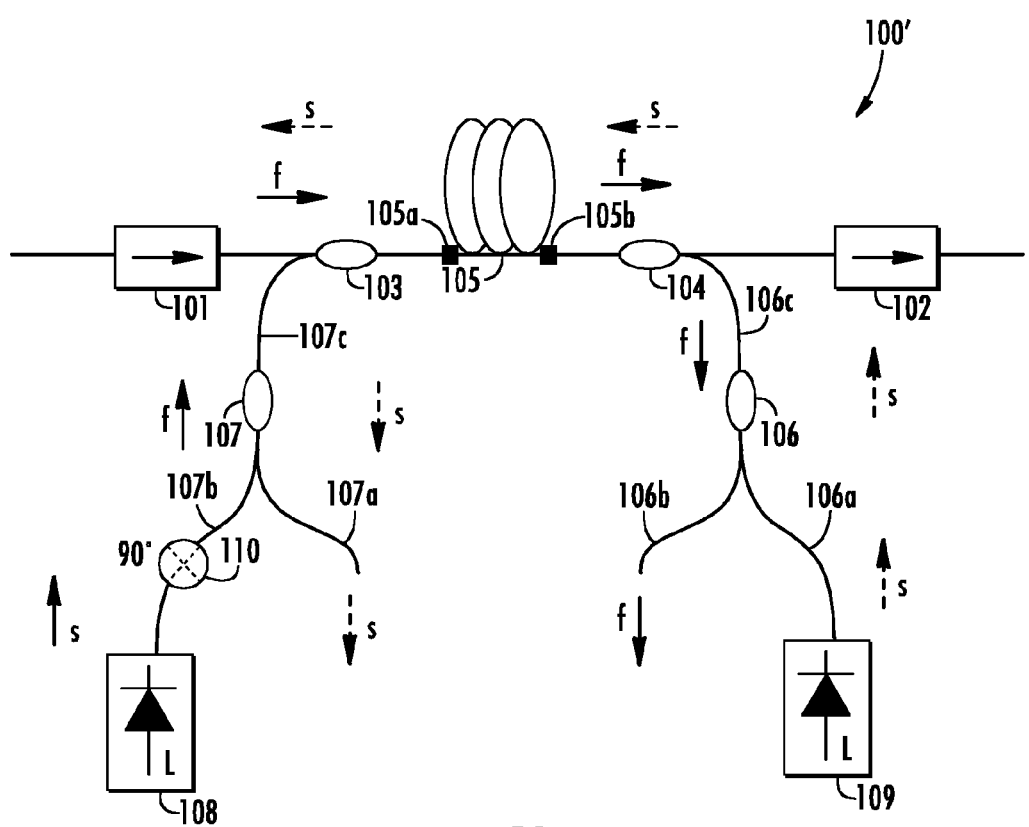
FIG. 1B shows the PM doped fiber amplifier in FIG. 1A along with optical isolators added at the input and at the output of the amplifier, according to an example embodiment.

FIG. 1B shows the PM doped fiber amplifier in FIG. 1A as 100' along with optical isolators 101 and 102 added at the input and the output of the amplifier, according to an example embodiment. The fiber-optic isolators 101 and 102 can comprise a Faraday isolator.

Figure 2:
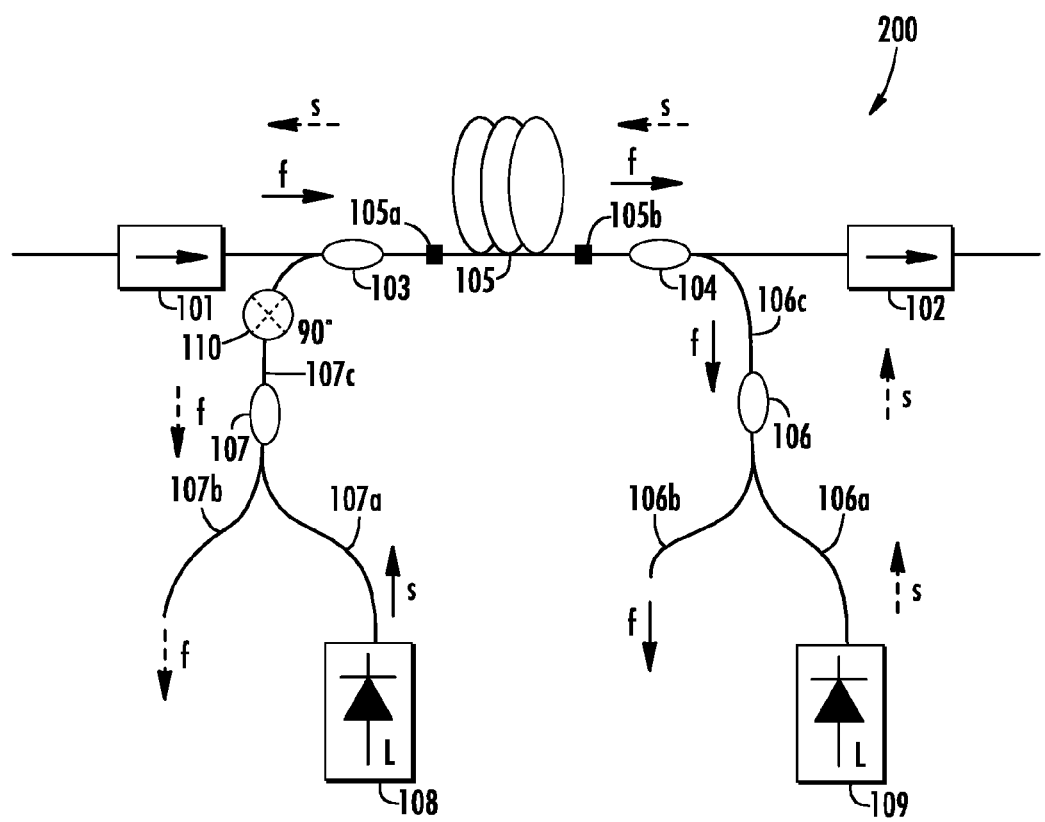
FIG. 2 shows the fiber amplifier in FIG. 1B modified so that the polarization rotator is now between the PBCS and the WDM coupler instead of being between the pump light source and the PBCS, according to an example embodiment.

FIG. 2 shows the fiber amplifier 100' in FIG. 1B now shown as fiber amplifier 200 modified so that the polarization rotator 110 is now between the PBCS 107 and the WDM coupler 103 instead of being between the pump light source 108 and the PBCS 107.

Figure 3:
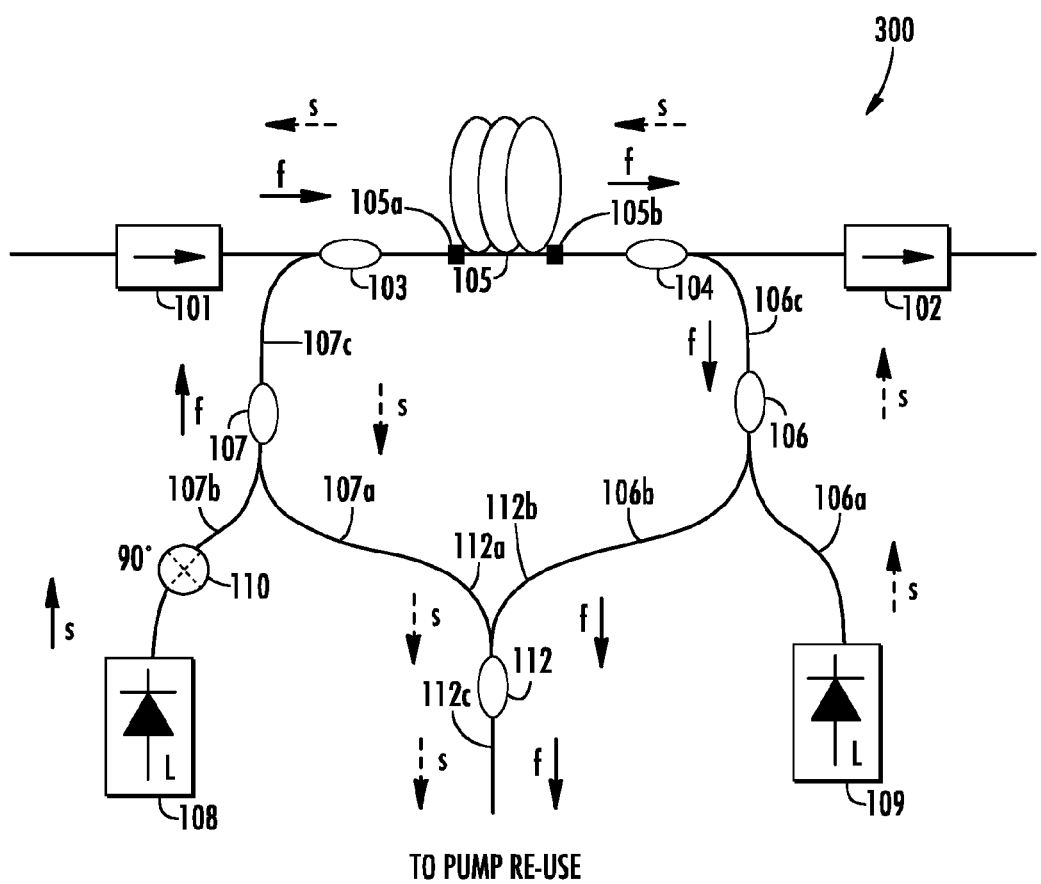
FIG. 3 shows the fiber amplifier in FIG. 1B modified to add another PBCS for implementing re-use of residual pump signals, according to an example embodiment.

FIG. 3 shows the fiber amplifier 100' in FIG. 1B now shown as fiber amplifier 300 modified to add another PBCS 112 to provide the advantage of re-use of residual pump light. Port 112a of PBCS 112 is coupled to port 107a of PBCS 107 and port 112b of PBCS 112 is coupled to port 106b of PBCS 106, with the re-used residual pump light provided at output port 112c. Light from port 112c can be used, for example, to pump a different amplifier stage within the same fiber amplifier, pump a different fiber amplifier, or used as calibration signal in a free-space laser communications (lasercom) link.

Figure 4:
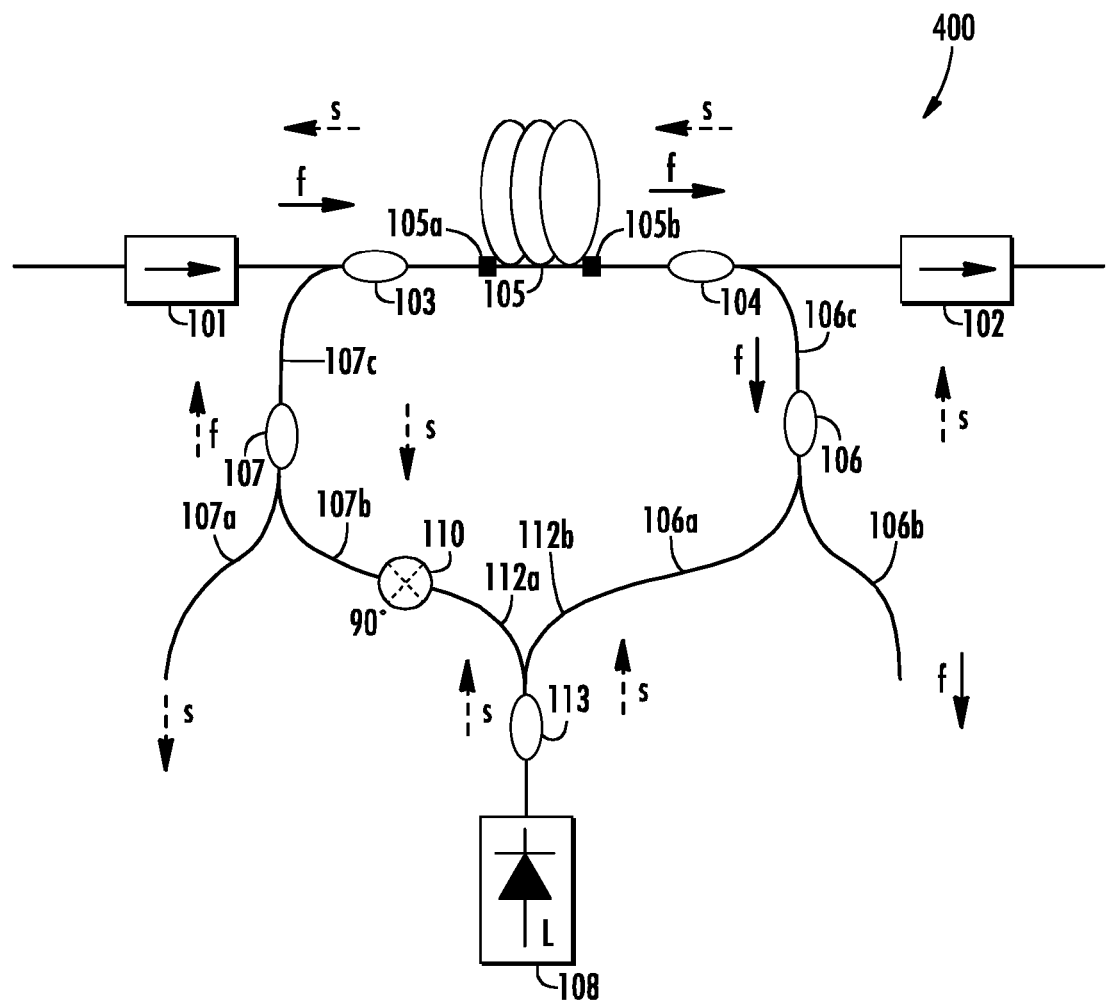
FIG. 4 shows a depiction of an example PM doped fiber amplifier that adds an optical power splitter to enable utilizing a single pump light source to bi-directionally pump the fiber amplifier, according to an example embodiment.

FIG. 4 shows a depiction of an example PM doped fiber amplifier shown as fiber amplifier 400 that adds a 1×2 optical power splitter 113 to utilize a single pump light source shown as pump light source 108 to bi-directionally pump the doped fiber 105 of the fiber amplifier 400. A polarization rotator 110 is positioned between the power splitter 113 and the PBCS 107 which rotates the light polarization received by 90 degrees. Downstream pumping is through the path from PBCS 107 through WDM coupler 103 and upstream pumping is through the path PBCS 106 through WDM coupler 104. The use of a single pump light source to bi-directionally pump the fiber amplifier 400 provides advantages including a reduction in the fiber amplifier size and its complexity.

Figure 5A:
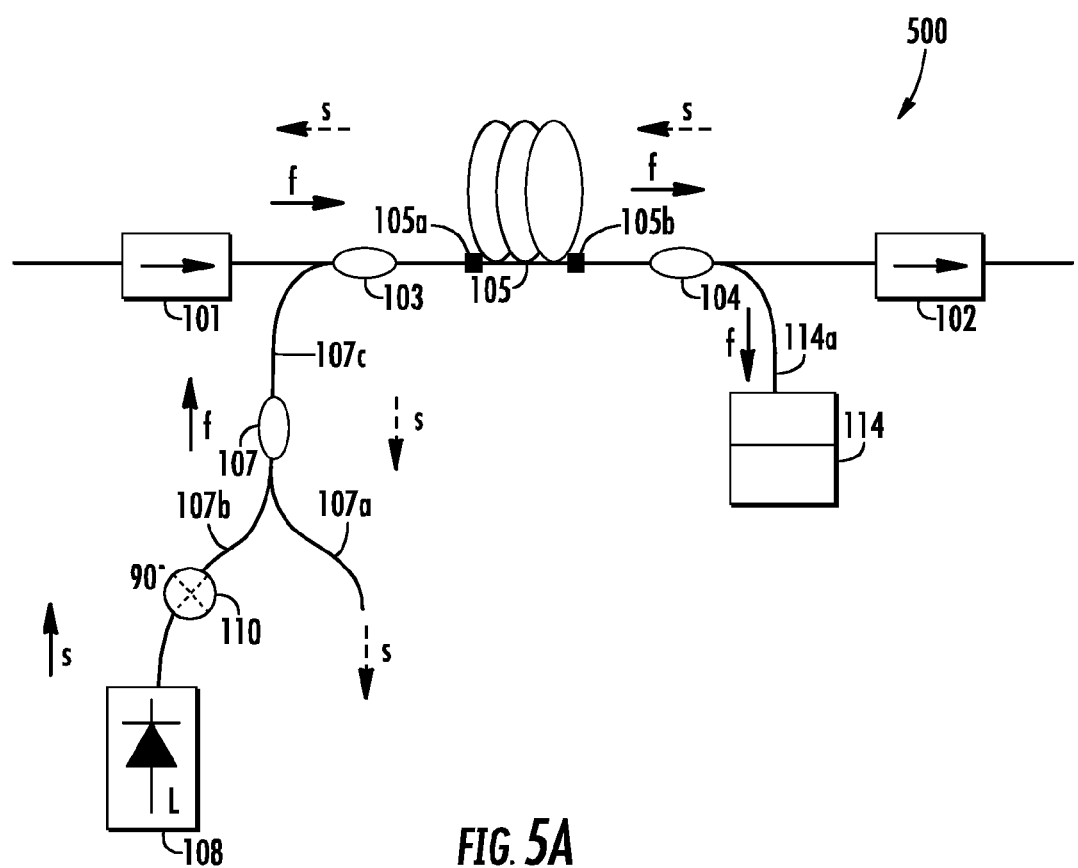
FIG. 5A shows a depiction of an example PM doped fiber amplifier that uses a single downstream pump light source to bi-directionally pump the amplifier achieved using a fiber-coupled rotator mirror which re-circulates residual pump light, according to an example embodiment.

FIG. 5A shows a depiction of an example PM doped fiber amplifier shown as fiber amplifier 500 that uses a single downstream pump light source 108 to bi-directionally pump the doped fiber 105 of the fiber amplifier 500 by using a fiber-coupled rotator mirror 114 which re-circulates residual pump light received from WDM coupler 104 at port 114a to upstream pump the doped fiber 105. As with fiber amplifier 400, the use of a single pump light source to bi-directionally pump the fiber amplifier 500 provides the advantages of a reduction in the fiber amplifier size and its complexity.

Figure 5B:
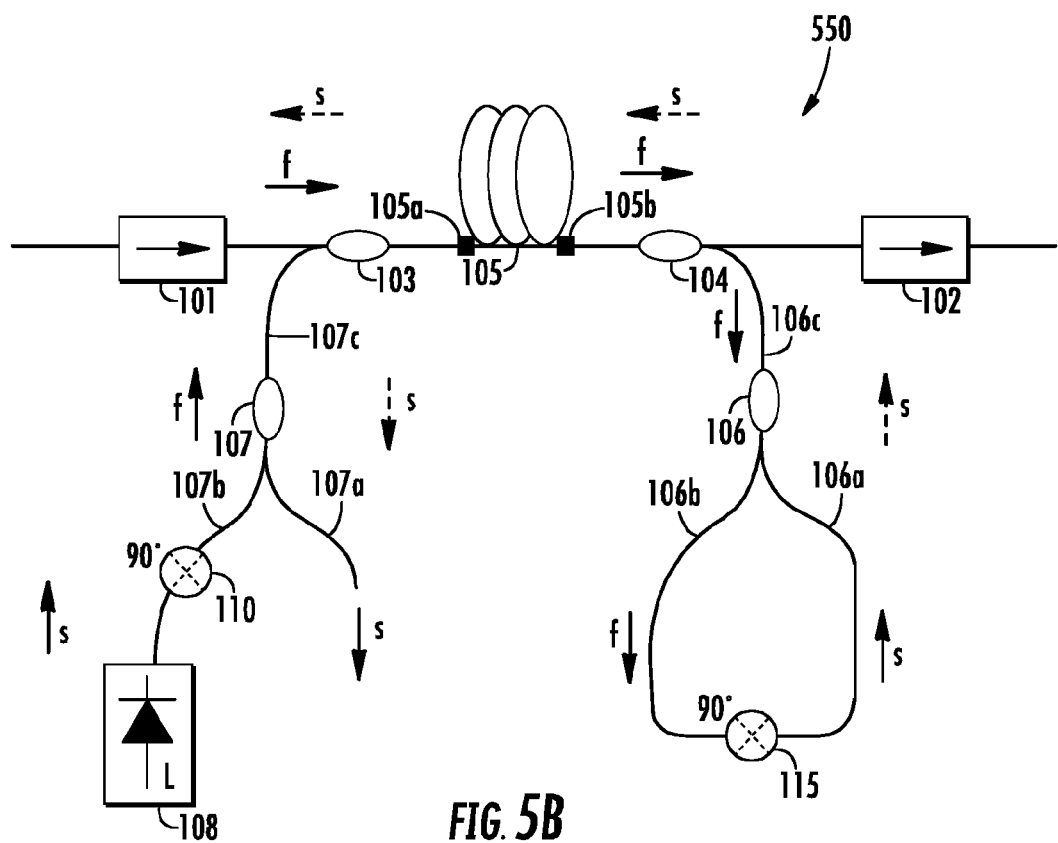
FIG. 5B shows a depiction of an example PM doped fiber amplifier which replaces the fiber coupled rotator mirror in FIG. 5A with PBCS outputs that are coupled together through a second polarization rotator, according to an example embodiment.

FIG. 5B shows a depiction of an example PM doped fiber amplifier shown as fiber amplifier 550 which replaces the fiber coupled rotator mirror 114 in FIG. 5A with a PBCS 106 having port 106c receiving light from WDM coupler 104, according to an example embodiment. Ports 106a and 106b that are coupled together through a second polarization rotator 115, Advantage(s) of this arrangement is the implementation of the fiber coupled rotator mirror 114 with a fused device (same as the one used to couple the pump light sources into the fiber-optic amplifier path) that can be compared to a conventional solution that is based on fiber coupled micro-optics. Fused devices are generally significantly better in terms of reliability and manufacturability. In addition in the case of a high reliability system that involves qualification, this specific implementation will be more cost-effective since it does not introduce any new components as it re-uses the same component as the one used to couple the pump light source into the fiber-optic path.

As noted above, residual pump light that is injected in the at least one pump light source (108 and/or 109) is greatly suppressed by disclosed fiber amplifier systems without the need for using different pump light source wavelengths. This will improve the lifetime and the reliability of the pump light source(s) and hence the reliability of the fiber amplifier system. Stable fiber amplifier performance is also provided as the suppression of the cross-talk between co-propagating and counter-propagating pump light enhances the gain stability of the fiber amplifier.

Moreover, the disclosed use of a single pump light source or pump light sources both at a single emission wavelength will reduce the fiber amplifier optical assembly cost. Especially in the case of high reliability applications such as space, in which amplifiers are subjected to rigorous screening and qualification tests, the conventional selection of different pump wavelengths for a fiber amplifier means a linear increase of screening/qualification testing cost, which adds to the development cost and recurring price of the fiber amplifier as a product, which is avoided by disclosed fiber amplifiers.

Disclosed PM doped fiber amplifiers can be used in a wide variety of optical systems. For example, for applications in telecommunications such as free-space laser communications, fiber lasers, optical switching, sensing, and microwave photonics.

Those skilled in the art to which this disclosure relates will appreciate that many other embodiments and variations of embodiments are possible within the scope of the claimed invention, and further additions, deletions, substitutions and modifications may be made to the described embodiments without departing from the scope of this disclosure. For example, disclosed embodiments can also be applied to free-space implementations where the optical amplifier is constructed using free-space optical elements, with the active fiber replaced by a solid state gain medium, the WDM coupler replaced with a dichroic beam splitter, and the PBCS replaced with a waveplate.

Notwithstanding that the numerical ranges and parameters setting forth the broad scope of this Disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

The invention claimed is:

1. A bi-directionally pumped polarization maintaining (PM) fiber amplifier, comprising:
    a PM fiber-optic amplifier path including an input of said fiber amplifier coupled to receive an optical signal for amplification which is coupled to a first wavelength-division multiplexing (WDM) coupler, and a second WDM coupler providing an output of said fiber amplifier, with a doped fiber spliced between said first WDM coupler and said second WDM coupler;
    at least a first pump light source emitting at a first wavelength along a first polarization axis coupled to said first WDM coupler through a first polarization beam combiner/splitter (PBCS) and a polarization rotator for downstream pumping of said doped fiber with light along a second polarization axis that is 90 degrees rotated relative to said first polarization axis, and
    for upstream pumping of said doped fiber with light oriented along said first polarization axis, one of a second pump light source emitting at said first wavelength along said first polarization axis coupled by a second PBCS to said second WDM coupler, an optical power splitter having an input coupled to said first pump light source and its output coupled by said second PBCS to said second WDM coupler, and a fiber-coupled rotator mirror for recirculating residual light coupled to said second WDM coupler.

2. The PM fiber amplifier of claim 1, wherein said PM fiber amplifier includes said second pump light source.

3. The PM fiber amplifier of claim 1, wherein said PM fiber amplifier comprises said power splitter.

4. The PM fiber amplifier of claim 1, wherein said PM fiber amplifier comprises said fiber-coupled rotator mirror.

5. The PM fiber amplifier of claim 4, wherein said fiber-coupled rotator mirror comprises said second PBCS having a first port and a second port that are coupled together through a second polarization rotator.

6. The PM fiber amplifier of claim 2, further comprising a third PBCS having a first port coupled to a port of PBCS and a second port coupled to a port of said PBCS, with combined re-used residual pump signals provided at an output port.

7. The PM fiber amplifier of claim 1, wherein said polarization rotator comprises a 90 degree splice connection.

8. The PM fiber amplifier of claim 1, wherein said doped fiber is rare earth doped.

9. The PM fiber amplifier of claim 1, wherein said doped fiber comprises a double-clad fiber including a doped core and an inner cladding, further comprising optics for launching said optical signal into said doped core and for launching light from said first pump light source into said inner cladding.

10. The PM fiber amplifier of claim 1, further comprising a first fiber-optic isolator at said input and a second fiber-optic isolator at said output.

11. A method of optical signal amplification, comprising:
    providing polarization maintaining (PM) fiber amplifier, comprising a PM fiber-optic amplifier path including an input of said fiber amplifier coupled to receive an optical signal for amplification which is coupled to a first wavelength-division multiplexing (WDM) coupler, and a second WDM coupler providing an output of said fiber amplifier, with a doped fiber spliced between said first WDM coupler and said second WDM coupler, and at least a first pump light source emitting at a first wavelength along a first polarization axis coupled to said first WDM coupler through a first polarization beam combiner/splitter (PBCS) and a polarization rotator;
    downstream pumping said doped fiber with light along a second polarization axis that is 90 degrees rotated relative to said first polarization axis by coupling light output by said polarization rotator, and
    upstream pumping said doped fiber with light having a polarization state oriented along said first polarization axis.

12. The method of claim 11, wherein said upstream pumping comprises:
    using a second pump light source emitting at said first wavelength and along said first polarization axis coupled by a second PBCS to said second WDM coupler, using an optical power splitter having an input to said first pump light source and its output coupled by said second PBCS to said second WDM coupler, using a fiber-coupled rotator mirror for recirculating residual light coupled to said second WDM coupler.

13. The method of claim 12, wherein said PM fiber amplifier includes said second pump light source.

14. The method of claim 12, wherein said PM fiber amplifier comprises said power splitter.

15. The method of claim 12, wherein said PM fiber amplifier comprises said fiber-coupled rotator mirror.

16. The method of claim 15, wherein said fiber-coupled rotator mirror comprises said second PBCS having a first port and a second port that are coupled together through a second polarization rotator.

17. The method of claim 11, wherein said providing further comprises providing a third PBCS having a first port coupled to a port of said first PBCS and a second port coupled to a port of a second PBCS, said third PBCS outputting combined re-used residual pump signals at its output port.

18. The method of claim 11, wherein said polarization rotator comprises a 90 degree splice connection.

19. The method of claim 11, wherein said doped fiber is rare earth doped.

20. The method of claim 11, wherein said doped fiber comprises a double-clad fiber including a doped core and an inner cladding, further comprising launching said optical signal into said doped core and launching light from said first pump light source into said inner cladding.

\* \* \* \* \*